United States Patent [19]
DiFonzo et al.

[11] Patent Number: 4,894,837
[45] Date of Patent: Jan. 16, 1990

[54] ABSORBING FILTER IN PUMP CAVITY FOR CONTROL OF BEAM QUALITY

[75] Inventors: John C. DiFonzo, San Mateo County; Bertram C. Johnson, Sunnyvale, both of Calif.

[73] Assignee: Spectra-Physics, San Jose, Calif.

[21] Appl. No.: 273,210

[22] Filed: Nov. 18, 1988

[51] Int. Cl.$^4$ .............................................. H01S 3/93
[52] U.S. Cl. ........................................ 372/72; 372/35; 372/40; 372/41
[58] Field of Search ....................... 372/72, 70, 73, 33, 372/35, 40, 41

[56] References Cited

U.S. PATENT DOCUMENTS

| | | | |
|---|---|---|---|
| 3,356,966 | 12/1967 | Miller | 372/72 |
| 3,504,300 | 3/1970 | Mazelsky et al. | 372/72 |
| 3,516,011 | 6/1970 | Hadwin | 372/72 |
| 3,764,935 | 10/1973 | Iorizzo et al. | 372/72 |
| 4,039,970 | 8/1977 | Shiroki et al. | 372/70 |
| 4,232,276 | 11/1980 | Iwata | 372/72 |
| 4,310,808 | 1/1982 | Byer et al. | 372/70 |
| 4,429,394 | 1/1984 | Guch, Jr. | 372/72 |

FOREIGN PATENT DOCUMENTS 0226790 7/1987 European Pat. Off. .............. 372/72

OTHER PUBLICATIONS

Czarniewski; "Spectral Filter for a Nd: Yaig Pumping Cavity", Applied Optics; vol. 10, No. 6; 06/1971; pp. 1460–1461.
CVI Laser Corporation, "Laser Products Catalogue" [p. 10].
Schott Glass Technologies, Inc., "Optical Glass Filters" Catalogue [p. 7].
Koechner, *Solid State Laser Engineering* (1976), p. 254.
Schnell et al., "2.92-μm Erbium Laser Operated at 125 Hz", Amosa Conference, 31 Oct. 1988.

*Primary Examiner*—Frank Gonzalez
*Attorney, Agent, or Firm*—Fliesler, Dubb, Meyer & Lovejoy

[57] ABSTRACT

In a laser apparatus which includes a laser medium exhibiting thermally induced optical distortions, and flash lamp mounted near the laser medium to provide laser pumping radiation, an absorbing filter is mounted between the flash lamp and the laser medium for absorbing radiation in the output spectrum of the lamp which exhibits a low fluorescence efficiency in the laser medium. By absorbing radiation with the low fluorescence efficiency in the laser medium, heat which develops in the laser medium can be limited to control the thermally induced optical distortions.

37 Claims, 2 Drawing Sheets

ABSORBING FILTER IN PUMP CAVITY FOR CONTROL OF BEAM QUALITY

BACKGROUND OF THE INVENTION

1. Field of the Invention

The present invention relates to the design of pumping cavities for lasers optimized to reduce thermally induced optical distortions in solid state laser media.

2. Description of Related Art

Lasers using solid state media, such as Nd:YAG, are often implemented with a pumping cavity which encloses both the medium and a lamp providing pumping radiation. Prior art systems of this type are described in U.S. Pat. No. 4,039,970, invented by Shiroki et al., issued Aug. 2, 1977, and in Czarniewski, "Spectral Filter for Nd:YAlG Pumping Cavity", Applied Optics, Vol.10, no.6, June 1971.

Lamps providing pumping radiation, particularly when operated in a pulsed mode, exhibit an output spectrum which typically does not match the fluorescence efficiency spectrum of the laser medium. For example, FIG. 1 shows the spectrum of a xenon flash lamp which exhibits essentially a "black body" radiation profile characterized by high intensity in the ultraviolet range with decreasing intensity toward the infrared end of the spectrum. By contrast, the relative efficiency of fluorescence for Nd:YAG is a function of the excitation wavelength as shown in FIG. 2. It can be seen that the fluorescence efficiency at the UV end of the range is negligible compared with the spectrum above about 700 nanometers. Thus, the high intensity UV radiation supplied by the xenon flash lamp is inefficiently utilized by the laser medium and results in unwanted heat.

As discussed in the Czarniewski and Shiroki et al. references cited above, the UV radiation is known to cause, in addition, solarization in the laser media which results in permanent damage to the crystalline structure, decreasing the output efficiency of the laser. Czarniewski and Shiroki et al. address the solarization problem by placing absorbing filters which remove radiation below about 500 nanometers from the spectrum reaching the laser medium.

The Shiroki et al. reference describes a system in which the laser medium is yttrium-aluminate (YAlO$_3$). Yttrium-aluminate crystals do not exhibit thermally induced stress birefringence which damages the beam quality.

The filter implemented in the Shiroki et al. reference, therefore, simply addresses the problem of removing UV radiation in order to prevent solarization of the crystal to extend its useful life as a laser medium.

The Czarniewski reference describes a laser using Nd:YAG in the continuous wave mode. Czarniewski inserts an absorbing filter around the laser medium to absorb radiation under about 500 nanometers in order to prevent solarization of the YAG rod. The Czarniewski laser is operated in the continuous wave mode with multiple axial modes, so its output is depolarized and non-Gaussian. Therefore, Czarniewski is not concerned with reducing optical distortions, such as thermally induced stress birefringence in the rod. Furthermore, the pump lamp, when operated in the continuous mode, has an output spectrum which approaches a line source rather than having a "black body" profile as described above with respect to FIG. 1.

CVI Laser Corporation of Albuquerque, NM provides an alternative system for removing UV radiation produced by krypton and xenon flash lamps within laser pump cavities. In the CVI Laser Corporation system, a Pyrex tube with a dielectric coating which reflects UV radiation above 300 nanometers back into the lamp is used. The reflected UV radiation is absorbed by the plasma in the lamp to be re-emitted eventually in the laser pump bands. The Pyrex tube itself absorbs radiation below about 300 nanometers. The CVI Laser Corporation recommends use of the Pyrex tube around the flash lamps in order to reduce solarization of the rod, reduce thermal loading of the rod, and reduce deterioration of the pump cavity due to interaction with contaminants in the cooling system by the UV radiation. However, dielectric coatings are sensitive in their reflectivity to the angle of incidence of the light. So, for light from an extended, uncollimated source such as a flash lamp, they are not very effective. Also, flow tubes of this sort are quite expensive and are not adapted to optimizing control of the thermally induced stress birefringence because of limitations of coating technology.

For pulsed lasers operating with a gaussian or near gaussian transverse mode, stress-induced index of refraction variations and birefringence in the laser medium combine to reduce beam quality. Prior art systems attempt to limit these distortions due to excess heat by flowing an active cooling medium around the rod. However, such systems are ineffective to maintain the high beam quality desired for many pulsed systems.

SUMMARY OF THE INVENTION

The present invention provides a laser apparatus which includes a laser medium exhibiting thermally induced optical distortions. A flash lamp is mounted near the laser medium to provide laser pumping radiation. An absorbing filter is mounted between the flash lamp and the laser medium for absorbing radiation in the output spectrum of the lamp which exhibits a low fluorescence efficiency in the laser medium wherein the absorbed radiation includes a range of wavelengths extending above the UV (>390 nanometers). By absorbing radiation with the low fluorescence efficiency in the laser medium, heat which develops in the laser medium can be limited to control the thermally induced optical distortions.

According to one aspect of the present invention, the laser medium, flash lamp and filter are enclosed in a pump cavity through which a liquid cooling medium flows to remove excess heat. The filter according to this aspect, includes a coating resistant to corrosive attack by the cooling medium.

DESCRIPTION OF THE PREFERRED EMBODIMENT

Figure 5:
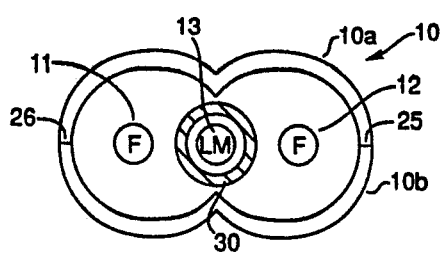
FIG. 5 is a cross-section of an alternative embodiment of a pump cavity according to the present invention.
Figure 6:
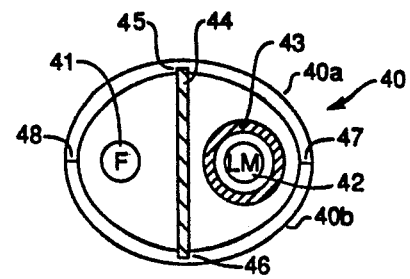
FIG. 6 is a cross-section of yet another alternative embodiment of the pump cavity according to the present invention.
Figure 7:
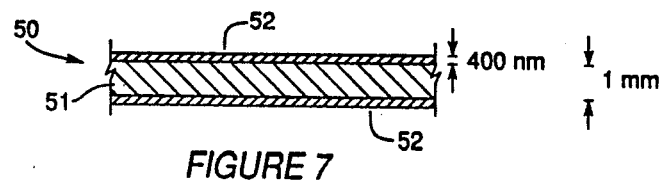
FIG. 7 shows the cross-section of a portion of the filter according to the present invention.

A detailed description of the preferred embodiment of the present invention is provided with respect to FIGS. 3-7. First, with reference to FIGS. 3-6, three alternative embodiments of pump cavities according to the present invention are described. With reference to FIG. 7, the optical filter used in the preferred system is described.

Figure 3:
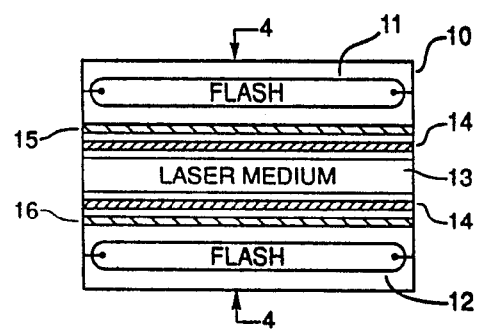
FIG. 3 is a diagram of a pump cavity according to the present invention.

FIG. 3 is a diagram of a pump cavity 10 which encloses a first flash lamp 11, a second flash lamp 12 and a laser medium 13. The first and second flash lamps 11, 12, are preferably xenon flash lamps operated in the pulse mode. The laser medium 13 exhibits thermally induced optical distortions, such as YAG, glass or other isotropic material. The laser medium is enclosed in a flow tube 14 through which a cooling medium such as water is pumped to remove excess heat. Likewise, the balance of the cavity 10 may be flooded with cooling medium to remove excess heat from the flash lamps 11, 12.

A first absorbing filter 15 and a second absorbing filter 16 are mounted between the first flash lamp 11 and the laser medium 13, and between the second flash lamp 12 and the laser medium 13, respectively. The filters 15, 16 absorb radiation in a first range of the output spectrum of the flash lamps 11, 12, while allowing radiation in a second range of the output spectrum of the flash lamps 11, 12 to pass through to the laser medium 13 to provide pumping radiation.

For systems using xenon flash lamps and Nd:YAG as a laser medium 13, the filter may be a RG665 as distributed by Schott Glass Technologies, Inc. in Duryea, PA, which absorbs radiation below 665 nanometers in wavelength. The RG665 filter distributed by Schott Glass Technologies, Inc. is a colloidally colored glass filter.

Figure 1:
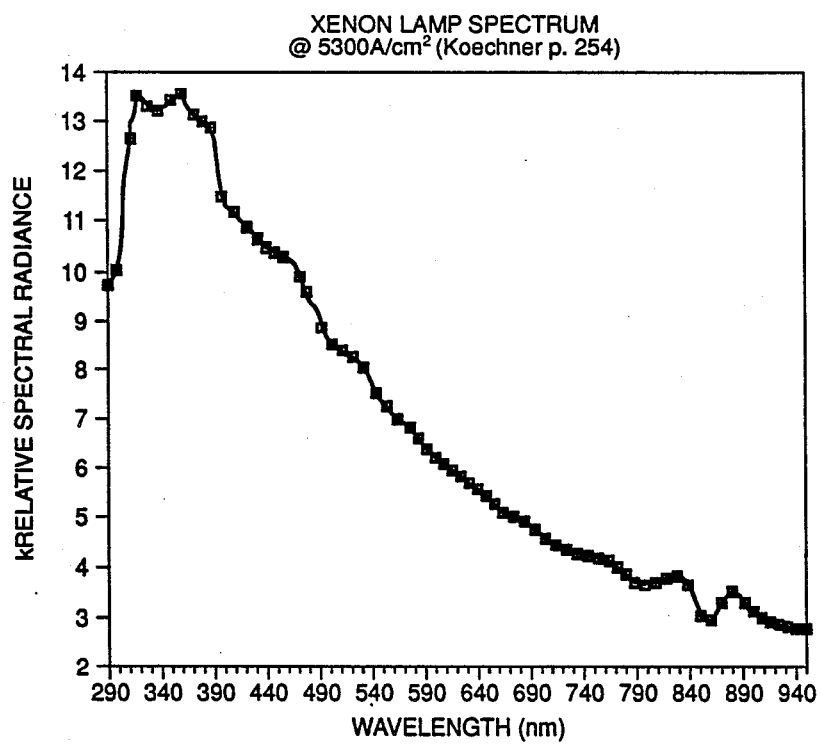
FIG. 1 is a graph showing the spectrum of a xenon flash lamp from Koechner, *Solid State Laser Engineering* (1976), p. 254.
Figure 2:
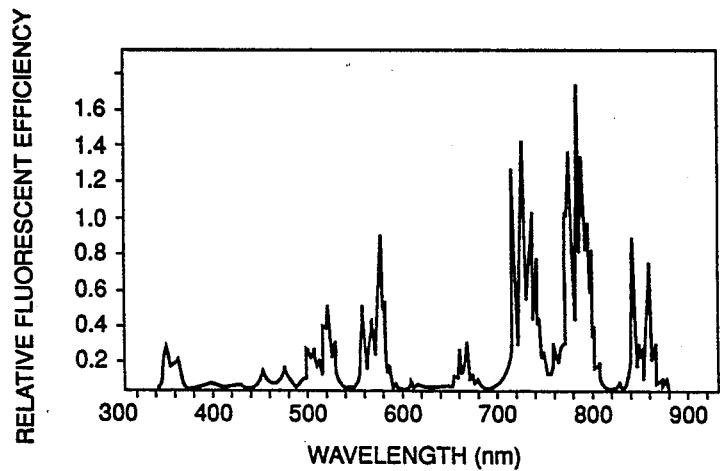
FIG. 2 is a graph showing the spectrum of relative efficiency of fluorescence of Nd:YAG.

For Nd:YAG exhibiting a relative fluorescence efficiency spectrum as shown in FIG. 2, it is found that any absorbing filter which passes radiation above a wavelength in the range of 600 to 700 nanometers, will beneficially control thermally induced optical distortions in the laser medium while having a minimal effect on output efficiency of the laser. As can be seen with reference to FIG. 2, this removes the radiation in the 500-550 nanometer and 580-600 nanometer ranges which are relatively efficient for producing fluorescence. However, it is found that the effect on pumping efficiency of removing this radiation is more than outweighed by the control over thermally induced optical distortions achieved by filtering out all radiation below 600 nanometers. A designer may desire to implement a selective filter passing radiation in these bands while filtering the balance of the radiation below 600 nanometers. According to this embodiment, the filter would pass selected output bands from the spectrum of the flash lamps while absorbing the balance of radiation generated.

Figure 4:
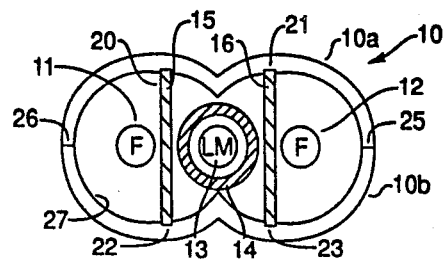
FIG. 4 is a cross-section diagram of a pump cavity shown in FIG. 3 through the planes parallel to 4—4.

FIG. 4 shows a cross-section of the pumping cavity 10 through a plane parallel to the line 4—4 of FIG. 3. As can be seen, the pump cavity 10 is a dual ellipse with the first flash lamp 11 at a first focal point of the lefthand allipse, the laser medium 13 at the second focal point of the lefthand ellipse, the laser medium 13 at the first focal point of the righthand ellipse and the flash lamp 12 at the second focal point of the righthand ellipse. In this manner, radiation generated by the flash lamps 11, 12 is focused on the laser medium 13 to provide high efficiency. The flow tube 14 surrounds the laser medium so that the cooling medium such as water can effectively remove heat from the laser medium. The filters 15, 16 are mounted within the cavity 10 by machining slots 20, 21, 22, 23 in the walls of the pump cavity adapted to receive edges of the filters 15, 16. The pump cavity includes a first half 10a and a second half 10b which can be separated at joints 25 and 26. This facilitates mounting of the various elements within the laser cavity as known in the art. The cooling medium flows through out the cavity to remove excess heat as known in the art.

The inner surface 27 of the pump cavity 10 in the preferred system is preferably bead-blasted gold which provides a high reflectivity but prevents breakthrough in the laser medium 13 due to overfocusing. Thus the bead-blasted gold promotes a uniform pumping profile in the laser medium 13.

Alternatively, a diffused reflection cavity manufactured with barium sulphate, teflon, magnesium oxide or other diffusely reflecting substance, could be used in close-coupled cavity arrangement.

FIG. 5 illustrates an alternative embodiment to the laser cavity 10 according to the present invention. In the embodiment of FIG. 5, a dual ellipse laser cavity is implemented in which a filter 30 is a cylindrical flow tube around the laser medium 13. The filter 30 may function dually as a flow tube for the cooling medium, and an absorbing filter having the characteristics of the filters 15, 16 of FIG. 4. Such a cylindrical filter 30 may be manufactured by forming ingots, core drilling, boring, grinding to size and finally, polishing. However, manufacturing a plate filter such as filters 15, 16 of FIG. 4 is much simpler. Such plate filters can be purchased commercially as discussed above.

FIG. 6 is yet another alternative of a laser cavity 40 according to the present invention. The laser cavity 40 is a single ellipse with a first focal point at a first flash lamp 41 and a second focal point at the laser medium 42. A flow tube 43 surrounds the laser medium to provide a channel for flowing cooling medium. The filter 44 is mounted between the flash lamp the laser medium in slots 45 and 46. The pump cavity 40 includes a first half 40a and a second half 40b which may be separated at joints 47 and 48. The filter 44 would have similar characteristics to the filters 15, 16 as discussed above with reference to FIGS. 3 and 4.

FIG. 7 is a cross-section of a filter 50 suitable for use in the systems described with reference to FIGS. 3-6. The filter 50 will include colloidally colored glass 51, approximately 1 millimeter thick, such as can be purchased commercially as the RG665 filter from Schott Glass Technologies, Inc. Alternative filters commercially available include the R-64 and R-66 "Sharp-Cut Filters", distributed by Hoya Optics, Inc. in Fremont, CA.

The colloidally colored glass filter 50 includes a coating 52 which is resistive to corrosion by the cooling medium flowing through the laser pumping cavities. In addition, the coating 52 is anti-reflective, which provides for transmission of the desired range of radiation with high efficiency. The coating 52 in the preferred system on an RG 665 filter is 400 nanometers of fused silica deposited by vacuum deposition. The fused silica has high resistance to a water cooling medium and is an anti-reflective coating. Other coatings, such as sapphire, may be used as known in the art.

In a system as illustrated in FIG. 4, run at an average power of 30 Hz. at 60 joules per pulse, it is found that the protective coating 52 on the filter 50 greatly increases performance. In one experiment, after 100 hours of laser operation, an uncoated filter was badly etched, causing reduction of transmission of the filter and a 20 per cent loss in laser power. Using the fused silica coating 52 on the same RG665 filter, no appreciable drop in power was observed after 100 hours. In the preferred system, the cooling medium is distilled water with a flow rate of two gallons per minute through the pump cavity.

Using filters to reduce heat in the laser medium provides the ability to control thermally induced optical distortions in pulsed lasers.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for amplifying coherent radiation propagating along an optical path, comprising:
   a laser medium mounted along the optical path, the medium exhibiting thermally induced distortions;
   a flash lamp, mounted adjacent the laser medium outside of the optical path to provide laser pumping radiation for the laser medium, the lamp having an output spectrum characterized by a first band with low fluorescence efficiency in the laser medium, and a second band with high fluorescence efficiency in the laser medium;
   a filter mounted between the flash lamp and the laser medium for absorbing the first band of the output spectrum of the lamp to control the thermally induced optical distortions in the laser medium while transmitting the second band; and
   a pump cavity enclosing the laser medium, flash lamp and filter with a liquid cooling medium flowing through the cavity to remove heat; wherein the filter includes a coating resistive to the cooling medium.

2. The apparatus of claim 1, wherein the laser medium comprises YAG.

3. The apparatus of claim 2, wherein the first band falls below a wavelength in the range from 600 to 700 nanometers.

4. The apparatus of claim 1, wherein the coating is fused silica.

5. The apparatus of claim 4, wherein the cooling medium comprises water.

6. The apparatus of claim 1, wherein the filter comprises colloidally colored glass.

7. The apparatus of claim 6, wherein the coating is fused silica.

8. The apparatus of claim 7, wherein the cooling medium comprises water.

9. The apparatus of claim 1, wherein the coating resistive to the cooling medium is anti-reflective.

10. An apparatus for amplifying coherent radiation propagating along an optical path, comprising:
    a laser medium mounted along the optical path, the medium exhibiting thermally induced optical distortions, and characterized by a spectrum of fluorescence efficiency having a first range characterized by at least a portion having wavelengths longer than 390 nanometers, and a second range, the second range being a range for pumping the laser medium, and the first range inducing heat in the laser medium;
    a flash lamp, mounted adjacent the laser medium outside of the optical path to provide laser pumping radiation for the laser medium, the lamp having an output spectrum characterized by radiation in the first range and in the second range; and
    a filter mounted between the lamp and the lower medium for absorbing the first range of the output spectrum of the lamp to limit the thermally induced optical distortions in the laser medium; and
    a pump cavity enclosing the laser medium, flash lamp and filter with a liquid cooling medium flowing through the cavity to remove heat; wherein the filter includes a coating resistive to the cooling medium.

11. The apparatus of claim 10, wherein the laser medium comprises YAG.

12. The apparatus of claim 11, wherein the first range falls below a wavelength in the range from 600 to 700 nanometers.

13. The apparatus of claim 10, wherein the coating is fused silica.

14. The apparatus of claim 13, wherein the cooling medium comprises water.

15. The apparatus of claim 10, wherein the filter comprises colloidally colored glass.

16. The apparatus of claim 10, wherein the coating resistive to the cooling medium is anti-reflective.

17. An apparatus for amplifying coherent radiation propagating along an optical path, comprising:
    a laser medium mounted along the optical path, the medium exhibiting thermally induced optical distortions, and characterized by a spectrum of fluorescence efficiency having a first range characterized by at least a portion having wavelengths longer than 390 nanometers, and a second range, the second range being a range for pumping the laser medium, and the first range inducing heat in the laser medium;
    means, mounted adjacent the laser medium outside of the optical path, for providing laser pumping radiation for the laser medium, the laser pumping radiation having an output spectrum characterized by radiation in the first range and in the second range; and
    means, mounted between the means for providing laser pumping radiation and the laser medium, for absorbing the first range of the output spectrum of the means for providing laser pumping radiation, to limit the thermally induced optical distortions in the laser medium; and
    a pump cavity enclosing the laser medium, the means for providing and the means for absorbing, with a liquid cooling medium flowing through the cavity to remove heat; wherein the means for absorbing includes a coating resistive to the cooling medium.

18. The apparatus of claim 17, wherein the means for absorbing comprises:

a filter element surrounding the laser medium for absorbing the first range of radiation.

19. The apparatus of claim 18, wherein the filter element comprises colloidally colored glass.

20. The apparatus of claim 18, wherein the coating resistive to the cooling medium covers the filter element and is anti-reflective.

21. The apparatus of claim 17, wherein the laser medium comprises YAG.

22. The apparatus of claim 21, wherein the first range falls below a wavelength in the range from 600 to 700 nanometers.

23. The apparatus of claim 17 wherein the coating is fused silica.

24. The apparatus of claim 23, wherein the cooling medium comprises water.

25. An apparatus for amplifying coherent radiation propagating along an optical path, comprising:
- a laser medium having a first side and a second side and mounted along the optical path, the medium exhibiting thermally induced optical distortions, and characterized by a spectrum of fluorescence efficiency having a first range characterized by at least a portion having wavelengths longer than 390 nanometers, and a second range, the second range being a range for pumping the laser medium, and the first range inducing heat in the laser medium;
- a first lamp, mounted adjacent the first side of the laser medium outside of the optical path to provide laser pumping radiation for the laser medium, the lamp having an output spectrum characterized by radiation in the first range and in the second range; and
- a second lamp, mounted adjacent the second side of the laser medium outside of the optical path to provide laser pumping radiation for the laser medium, the second lamp having an output spectrum characterized by radiation in the first range and in the second range;
- means, mounted between the first lamp and the laser medium and between the second lamp and the laser medium, for absorbing the first range of the output spectrum of the first lamp and of the second lamp to limit the thermally induced optical distortions in the laser medium; and
- a pump cavity enclosing the laser medium, the first lamp, the second lamp and means for absorbing with a liquid cooling medium flowing through the cavity to remove heat; wherein the means for absorbing includes a coating resistive to the cooling medium.

26. The apparatus of claim 25, wherein the means for absorbing comprises:
- a first filter mounted between the first lamp and the laser medium for absorbing the first range of the output spectrum of the first lamp; and
- a second filter mounted between the second lamp and the laser medium for absorbing the first range of the output spectrum of the second lamp.

27. The apparatus of claim 26, wherein the first filter and the second filter comprise colloidally colored glass.

28. The apparatus of claim 25, wherein the means for absorbing comprises:
- a filter element surrounding the laser medium for absorbing the first range of radiation.

29. The apparatus of claim 28, wherein the filter element comprises colloidally colored glass.

30. The apparatus of claim 25, wherein the laser medium comprises YAG.

31. The apparatus of claim 30, wherein the first range falls below a wavelength in the range from 600 to 700 nanometers.

32. The apparatus of claim 25, wherein the coating is fused silica.

33. The apparatus of claim 32, wherein the cooling medium comprises water.

34. The apparatus of claim 25, wherein the means for absorbing comprises colloidally colored glass.

35. The apparatus of claim 34, wherein the coating is fused silica.

36. The apparatus of claim 35, wherein the cooling medium comprises water.

37. The apparatus of claim 25, wherein the coating resistive to the cooling medium is anti-reflective.

* * * * *